2,746,945
MODIFIED POLYVINYL ACETAL RESIN COMPOSITIONS

Francis T. Buckley, Ludlow, Mass., assignor to Monsanto Chemical Company, St. Louis, Mo., a corporation of Delaware No Drawing. Application August 14, 1952, Serial No. 304,449

4 Claims. (Cl. 260—45.7)

This invention relates to modified polyvinyl acetal resin compositions. More particularly, this invention relates to modified polyvinyl acetal resin compositions that may be subjected to relatively high operational temperatures during use without substantial deterioration.

Plasticized polyvinyl acetal resin compositions are easily bonded to other materials in order to form laminates of exceptionally high strength and durability that will not shatter under impact. Laminates having interlayers made from modified polyvinyl acetal resin compositions are in widespread use today and give reasonably satisfactory service in situations wherein relatively high operational temperatures are not encountered during use. However, when conventional laminates of this character are subjected to elevated temperatures, such as the temperatures encountered during high-speed aircraft flight, the polyvinyl acetal interlayer softens and becomes subject to plastic flow. Under such conditions the bond strength of the interlayer is substantially and permanently impaired.

Accordingly, an object of the present invention is the provision of modified polyvinyl acetal resin compositions.

Another object is the provision of modified polyvinyl acetal resin compositions that are stabilized against the deteriorating effects of relatively high operational temperatures.

These and other objects are attained by incorporating a stabilizing amount of a properly proportioned mixture of paratertiary amyl phenol and a triaryl fluorosilane into a plasticized polyvinyl acetal resin.

Such compositions can be stored for prolonged periods of time without substantial deterioration. They do not become discolored or suffer any significant loss of strength during sheeting or laminating operations. If a minor amount of water is present in the composition at the time of lamination, bond strength will not be materially affected. Completed laminates are surprisingly superior to conventional laminates, being initially much stronger and deteriorating more slowly and to a surprisingly lesser extent when exposed to relatively high operational temperatures.

The following examples are given in illustration and are not intended as limitations on the scope of this invention. Where parts are mentioned, they are parts by weight. The polyvinyl butyral resin used throughout the following tests contained approximately 18% hydroxyl groups calculated as polyvinyl alcohol and approximately 2% acetate groups calculated as polyvinyl acetate, the balance being substantially butyraldehyde acetal.

Samples having the formulations set forth in Table I were subjected to a rapid ageing test in order to demonstrate the heat-stability of polyvinyl acetal resin compositions prepared in accordance with the present invention. The rapid ageing test is a very severe one and simulates extreme and rigorous operational conditions. It is predicated on the fact that a polyvinyl acetal resin composition will progressively deteriorate when subjected to malaxation at elevated temperatures, the deterioration being accelerated by exposure to the atmosphere. The viscosity of the resin composition decreases as it deteriorates and if the malaxation is conducted at a constant rate, the torque required to malaxate the sample will decrease as the resin deteriorates. By measuring the rate at which the torque decreases, it is possible to determine the relative stability of a sample.

In making the tests, a standard Brabender testing machine was used and each sample was malaxated on this machine at a constant rate while at a temperature of 150° C. and exposed to the atmosphere. In each instance, the time required for the torque to diminish from its original value to 700 Brabender units was measured. The results are set forth in Table II.

TABLE I
*Composition of samples*

| Sample | Polyvinyl Butyral Resin (Parts) | Dibutyl Sebacate Plasticizer (Parts) | Para-tertiary Amyl Phenol (Parts) | Triphenyl Fluorosilane (Parts) |
|---|---|---|---|---|
| 1 | 100 | 37.5 | | |
| 2 | 100 | 37.5 | | 0.1 |
| 3 | 100 | 37.5 | | 0.2 |
| 4 | 100 | 37.5 | | 0.5 |
| 5 | 100 | 37.5 | | 1.0 |
| 6 | 100 | 37.5 | 0.2 | |
| 7 | 100 | 37.5 | 0.1 | 0.2 |

TABLE II
*Stability of compositions as determined by a rapid ageing test*

| Sample | Average Time Required For Torque to Decrease to 700 Brabender Units | Color of Sample at Completion of the Test |
|---|---|---|
| | *Minutes* | |
| 1 | 12 | Clear and Colorless. |
| 2 | 17 | Do. |
| 3 | 18 | Do. |
| 4 | 18 | Do. |
| 5 | 18 | Do. |
| 6 | 21 | Pronounced Yellow. |
| 7 | 25 | Clear and Colorless. |

As the results of this test indicate, sample 7 (the composition stabilized with a mixture of para-tertiaryamyl phenol and triphenyl fluorosilane) possessed a degree of stability far surpassing the stability of the other compositions tested and remained clear and colorless throughout the test. It is to be noted that the other samples containing one or none of the stabilizing materials deteriorated at a much more rapid rate. Sample 6 turned yellow but was the only sample that approached sample 7 in stability. From this it is seen that the plasticized polyvinyl acetal resin composition stabilized in accordance with the present invention was not substantially affected by high operational temperatures.

Laminates prepared from the compositions of the present invention are much stronger than conventional laminates and are suitable for use in situations wherein relatively high operational temperatures are encountered. This is shown by the following tests wherein laminates having interlayers prepared from the compositions of samples 1, 6 and 7 were tested for shear strength and rate of peel both before and after prolonged exposure in a standard weatherometer. Sample 6, the sample approaching sample 7 in stability, was used in the following tests to provide a satisfactory basis for comparison.

In order to test for shear strength, laminates were prepared by sandwiching a sheet of the interlayer to be tested between cover plates of hard acrylic resin, the interlayer being coated with an adhesive compatible with both materials in accordance with the standard laminating procedure that is followed when sheets of acrylic resin are to be bonded to polyvinyl acetal resin interlayers. See, for example, Neher et al. Patent Number 2,464,826, dated March 22, 1949. Each of the thus-prepared sandwiches was then subjected to a temperature of 275° F. and a pressure of 185 p. s. i. for a period of one hour in order to bond the interlayer to the cover plates. After being cooled, a lateral force was applied at one edge of the laminate parallel to and along the plane of lamination between one of the cover plates and the interlayer. The force required to rupture the bond and cause lateral displacement of the cover plate with respect to the interlayer was measured.

Laminates to be tested for rate of peel were prepared by bonding a sheet of interlayer to a single sheet of acrylic resin ½ inch wide and 8 inches long, using the above-described laminating procedure. In testing for rate of peel, each laminate was inclined at an angle of 20° from the vertical, the interlayer being on the inner-downward facing side of the laminate. A 10-pound weight was attached to the upper edge of the interlayer and the rate at which the gravitational pull of the weight peeled the interlayer from the cover plate was measured.

The results obtained by subjecting laminates to the above-described tests are set forth in the following tables.

TABLE III

Shear strength of laminates before and after ageing at elevated temperatures

| Sample | Average Original Shear Strength of Laminate | Average Shear Strength of Laminate after Exposure for 230 Hours in a Standard Weatherometer | Average Loss of Shear Strength as a Result of Ageing |
| --- | --- | --- | --- |
|  | P. s. i. | P. s. i. | Percent |
| 1 | 810 | 523 | 35½ |
| 6 | 884 | 582 | 34½ |
| 7 | 1,173 | 819 | 30½ |

TABLE IV

Rate at which interlayer peeled from cover plate before and after ageing

| Sample | Average Original Rate at which Interlayer Peeled from Cover Plate | Average Rate at Which Interlayer Peeled from Cover Plate After Exposure for 230 Hours in Standard Weatherometer | Average Loss as a Result of Ageing |
| --- | --- | --- | --- |
|  | Seconds/inch | Seconds/inch | Percent |
| 1 | 100 | 40 | 60 |
| 6 | 407 | 22 | 94½ |
| 7 | 642 | 311 | 51½ |

As the results of these tests demonstrate, the laminates having interlayers prepared from the composition of sample 7 were initially much stronger and deteriorated at a slower rate than the laminates having unstabilized interlayers or interlayers stabilized only with para-tertiary amyl phenol. As shown by the rate of peel test, the laminates having interlayers prepared from sample 6 were highly susceptible to de-lamination after being aged whereas the laminates prepared from the interlayer of sample 7 were almost as strong after being aged as the laminates of sample 6 were prior to ageing.

The deterioration noted in the preceding tests is largely attributable to the instability of the resin itself and the stabilizer primarily inhibits deterioration of the resin. As an illustration, unplasticized polyvinyl acetal resin compositions similar to samples 1, 6 and 7 were tested for stability. In this case the viscosity was measured directly.

Samples were prepared and the viscosity of each sample was measured at 20° C. Thereafter, the samples were malaxated on a colloid mill and formed into cakes under heat and pressure. Thin sheets were skived from the cakes and the viscosity of each of the sheets was measured at 20° C. both before and after ageing for 4 hours at a temperature of 90° C. The composition of the samples and the results obtained are set forth in the following table.

TABLE V

Stability of unplasticized polyvinyl acetal resin compositions as determined by viscosity measurements

| Sample | Composition of Sample | | | Viscosity Measurements | | |
| --- | --- | --- | --- | --- | --- | --- |
|  | Parts Polyvinyl Butyral Resin | Parts Para-Tertiary Amyl Phenol | Parts Triphenyl Fluorosilane | Average Original Viscosity of Resin Composition | Average Original Viscosity of Sheets Prepared from Compositions | Average Viscosity of Sheets After Ageing 4 Hours at 90° C. |
|  |  |  |  | Cps. | Cps. | Cps. |
| A | 100 |  |  | 229 | 153 | 123 |
| B | 100 | 0.2 |  | 212 | 171 | 153 |
| C | 100 | 0.1 | 0.2 | 212 | 162 | 183 |

From the above table it is seen that the polyvinyl butyral resin stabilized in accordance with the present invention had an initial viscosity similar to the viscosity of the other samples tested and was adversely affected by sheeting operations. However, when sheets prepared from the various compositions were exposed to elevated temperatures, the sheets stabilized with a mixture of para-tertiary amyl phenol and triphenyl fluorosilane behaved in an entirely different manner and were surprisingly resistant to deterioration. Thus, the sheets prepared from the other compositions decreased in viscosity whereas the sheets prepared in accordance with the present invention increased in viscosity.

It is thus apparent that polyvinyl acetal resin compositions stabilized with a mixture of para-tertiary amyl phenol and a triaryl fluorosilane are exceptionally resistant to deterioration as a result of exposure to relatively high operational temperatures, similar resins stabilized with either ingredient alone being subject to more rapid deterioration and having poor stability when exposed to relatively high operational temperatures.

All mixtures of para-tertiary amyl phenol and triaryl fluorosilane will not give such results and indiscriminate amounts of such mixtures cannot be used. It is necessary that the mixture be properly proportioned and that a proper quantity of the mixture be added to the resin composition to be stabilized.

As an illustration, compositions stabilized with various amounts and proportions of the stabilizing mixture of the present invention were prepared and tested for strength of adhesion. These tests further show that the strength of adhesion of interlayers stabilized in accordance with the present invention will not be materially impaired even though a minor amount of water may be present in the interlayer during laminating operations.

In testing for strength of adhesion, a testing procedure which is standard throughout the industry was used. The various ingredients of each sample were blended to form a uniform mixture and the mixture was formed into a cake under heat and pressure. After the cake had cooled, it was skived into thin sheets and laminates were then prepared by bonding cover plates of glass to each of the interlayers to be tested. A temperature of 275° F. and a pressure of 185 p. s. i. was applied for 10 minutes during the laminating operation in order to bond the interlayer to the glass. In order to condition the laminates for testing, they were cooled to a temperature of 0° F. and held at this temperature for a period of about one hour. After being conditioned and while still cold, each of the laminates was held at an angle against a heavy metal plate and hammered along the line of contact. The hammering took the form of solid blows delivered close together with the flat end of a one-pound ball peen hammer. About 12 square inches of each laminate was completely pulverized in this fashion, no flat glass surface remaining. Loose glass particles were removed from the laminate and the laminate was then allowed to warm to room temperature.

In accordance with standard grading procedure, adhesion was graded on an arbitrary scale of 10–0, corresponding to the percentage, on an area basis, of unexposed interlayer. The following table sets forth the arbitrary scale against the corresponding area of unexposed layer.

TABLE VI

*Adhesion grading scale*

| Grading | Percent of Area of Unexposed Interlayer |
|---|---|
| 10 | 100 |
| 9 | 98 |
| 8 | 95 |
| 7 | 90 |
| 6 | 80 |
| 5 | 60 |
| 4 | 40 |
| 3 | 15 |
| 2 | 5 |
| 1 | 1 |
| 0 | 0 |

The composition of the samples tested and the results obtained are set forth in the following tables. The percentage of water referred to in Table VIII is the percentage of water which was present in the polyvinyl butyral interlayer at the time of lamination based on the total weight of the composition.

TABLE VII

*Composition of samples*

| Sample | Parts Polyvinyl Butyral Resin | Parts Dibutyl Cellosolve Adipate Plasticizer | Parts Para-Tertiary Amyl Phenol | Parts Triphenyl Fluorosilane |
|---|---|---|---|---|
| 8 | 100 | 40 | 0.2 | 0.2 |
| 9 | 100 | 40 | 0.2 | 0.5 |
| 10 | 100 | 40 | 0.2 | 1.0 |

TABLE VIII

*Strength of adhesion of laminates*

| Sample | Adhesion of Interlayer containing 0.2% water at time of Lamination | Color of Sample | Adhesion of Interlayer containing 1.0% water at time of Lamination | Color of Sample |
|---|---|---|---|---|
| 8 | 10 minus | clear | 7 plus | clear. |
| 9 | 9 plus | very slightly yellow. | 4 minus | very slightly yellow. |
| 10 | 7 minus | do | 5 minus | Do. |

As the tabulated results show, the most satisfactory stabilization was obtained in the case of sample 8, almost perfect adhesion being obtained with a low water content. It is to be noted that the strength of adhesion of this sample was not substantially affected by a higher water content. Extremely good adhesion was also obtained in the case of sample 9 with a low water content, the higher water content causing a substantial decrease in strength. The results obtained in the case of sample 10 were passing, but relatively poor.

From the foregoing, it is seen that in modifying polyvinyl acetal resin compositions with stabilizing mixtures of paratertiary amyl phenol and triaryl fluorosilanes, it is necessary that the mixture be proportioned in such a manner that a satisfactory ratio of para-tertiary amyl phenol to triaryl fluorosilane is obtained. In addition, the quantity of the properly proportioned mixture added to the plasticized polyvinyl acetal resin must be such that the resultant composition contains a proper ratio of para-tertiary amyl phenol to polyvinyl acetal resin.

Polyvinyl acetal resin compositions are satisfactorily stabilized with mixtures containing from about 0.2 to 3.5 parts of triaryl fluorosilane per part of para-tertiary amyl phenol. The amount of mixture to be incorporated into a polyvinyl acetal resin to be stabilized may be varied in accordance with the material to be laminated and the use for which the laminate is intended, provided that the amount of mixture is such that from about 0.05 to 0.4 part of para-tertiary amyl phenol per 100 parts of polyvinyl acetal resin is present in the resultant composition. Within this broad range, satisfactory results are obtained although, as illustrated in sample 9, care must be taken to avoid excessive amounts of moisture in the preparation of the laminate.

When the amount of mixture of para-tertiary amyl phenol and triaryl fluorosilane incorporated into a polyvinyl acetal resin composition is such that the resultant compositions contain less than about 0.05 part of para-tertiary amyl phenol per 100 parts of resin, little stabilization against high operational temperatures will be obtained regardless of the amount of triaryl fluorosilane present and when the resultant composition contains more than about 0.4 part of para-tertiary amyl phenol per 100 parts of resin, adhesion is substantially impaired.

In accordance with a preferred form of the invention, the stabilizing mixture will contain from 0.2 to 2.5 parts of triaryl fluorosilane per part of para-tertiary amyl phenol and the amount of mixture incorporated into the polyvinyl acetal resin composition will be such that from about 0.1 to 0.2 part of para-tertiary amyl phenol per 100 parts of resin is present in the final composition. Optimum results are achieved within this preferable range of proportions and polyvinyl acetal resin compositions stabilized in this fashion will be especially resistant to the deteriorating effects of relatively high operational temperatures.

Triaryl fluorosilanes other than triphenyl fluorosilane or mixtures of triaryl fluorosilanes may be used with equally satisfactory results. The triaryl fluorosilanes are monomeric solids of the formula $R_3FSi$, wherein R is an aryl group such as phenyl, naphthyl, etc., an alkyl substituted aryl group in which the alkyl group contains from 1 to 8 carbon atoms or a halogen substituted aryl group wherein the substituent halogens are fluorine, chlorine, bromine or iodine. Thus, among the compounds which may be used, alone or in combination, are tritolyl fluorosilane, tri(p-n-octyl phenyl) fluorosilane, tri(p-chlorophenyl) fluorosilane, triphenyl fluorosilane, etc.

Any suitable plasticizer may be used in preparing the polyvinyl acetal composition, satisfactory plasticizers including compounds such as triethylene glycol di-2-ethyl butyrate, dibutyl Cellosolve adipate, dibutyl sebacate, dialkyl phthalates, triaryl phosphates, etc.

The polyvinyl acetal resins employed in accordance with the present invention may be made by reacting an aldehyde with a partially or completely hydrolyzed polyvinyl ester. Suitable methods for preparing such resins are set forth in Morrison, et al. Patent Number Re. 20,430, dated June 29, 1937. Polyvinyl acetal resins prepared in this manner have a certain number of ester groups, originally present in the polyvinyl ester, which have not been removed, as well as a certain number of hydroxyl groups which have not been replaced by acetal groups.

Polyvinyl acetal resins may be made from various unsubstituted aldehydes or mixtures thereof or even from unsubstituted ketones containing an active carbonyl group or from mixtures of unsubstituted aldehydes and ketones.

Thus, formaldehyde, acetaldehyde, propionaldehyde, butyraldehyde, valeraldehyde, hexaldehyde, benzaldehyde, crotonaldehyde, cyclohexanone and the like and mixtures thereof may be employed. In general, polyvinyl acetal resins made from saturated lower unsubstituted aliphatic aldehydes are preferred. In particular, polyvinyl acetal resins made from unsubstituted saturated aliphatic aldehydes containing less than 6 carbon atoms and especially those made from formaldehyde, acetaldehyde and butyraldehyde and mixtures thereof are preferred.

According to one embodiment of the present invention, the polyvinyl acetal resins employed may be considered to be made up, on a weight basis, of from 5 to 25% hydroxyl groups, calculated as polyvinyl alcohol, 0 to 40% acetate groups, calculated as polyvinyl acetate, and the balance substantially acetal.

When the acetal is butyraldehyde acetal, the polyvinyl acetal resin will preferably contain, on a weight basis, from 16 to 29% hydroxyl groups, calculated as polyvinyl alcohol, and 0 to 3% acetate groups, calculated as polyvinyl acetate, the balance being substantially butyraldehyde acetal.

When the acetal is formaldehyde, preferably the polyvinyl acetal resin will contain from 5 to 8% hydroxyl groups, calculated as polyvinyl alcohol, 10 to 16% acetate groups, calculated as polyvinyl acetate, the balance being substantially formaldehyde acetal.

An example of a polyvinyl acetaldehyde acetal is one containing 7% hydroxyl groups, calculated as polyvinyl alcohol, 17% acetate groups, calculated as polyvinyl acetate, and the balance substantially acetaldehyde acetal.

An example of a mixed acetal resin is one which contains 12% hydroxyl groups, calculated as polyvinyl alcohol, from 2 to 6% acetate groups, calculated as polyvinyl acetate, and the balance acetaldehyde and butyraldehyde acetal groups in a molar ratio of 65 to 50% acetaldehyde and 35 to 50% butyraldehyde groups.

It is obvious that many variations may be made in the products and process of this invention without departing from the spirit and scope thereof as defined by the appended claims.

What is claimed is:

1. A composition of matter comprising a polyvinyl butyraldehyde resin, a plasticizer, 0.10 part of paratertiary amyl phenol per 100 parts of resin and 2.0 parts of triphenyl fluorosilane per 100 parts of resin.

2. A composition of matter comprising a polyvinyl acetal resin, a plasticizer, from 0.05 to 0.4 part of paratertiary amyl phenol per 100 parts of polyvinyl acetal resin and from 0.2 to 3.5 parts of triphenyl fluorosilane per part of paratertiary amyl phenol.

3. A composition of matter as in claim 2 wherein the polyvinyl acetal resin is a polyvinyl butyraldehyde resin.

4. A composition of matter as in claim 2 wherein the amount of paratertiary amyl phenol is limited to from 0.1 to 0.5 part per 100 parts of polyvinyl acetal resin and the amount of triphenyl fluorosilane is limited to from about 0.2 to 2.5 parts per part of paratertiary amyl phenol.

References Cited in the file of this patent
UNITED STATES PATENTS

| | | |
|---|---|---|
| 2,332,896 | D'Alelio | Oct. 26, 1943 |
| 2,528,338 | Cairns | Oct. 31, 1950 |